(12) United States Patent
Chen et al.

(10) Patent No.: US 7,689,084 B2
(45) Date of Patent: Mar. 30, 2010

(54) OPTICAL FIBER AND A METHOD OF MAKING

(75) Inventors: Xin Chen, Corning, NY (US); Joohyun Koh, Painted Post, NY (US); Ming-Jun Li, Horseheads, NY (US); Anping Liu, Big Flats, NY (US); Deborah Lynn Marlatt, Addison, NY (US); Ji Wang, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/418,766

(22) Filed: Apr. 6, 2009

(65) Prior Publication Data
US 2009/0274428 A1 Nov. 5, 2009

Related U.S. Application Data

(60) Provisional application No. 61/125,955, filed on Apr. 30, 2008.

(51) Int. Cl.
*G02B 6/00* (2006.01)
*G02B 6/02* (2006.01)

(52) U.S. Cl. .................. 385/123; 385/141; 385/144

(58) Field of Classification Search .............. 385/123, 385/141, 144
See application file for complete search history.

(56) References Cited

U.S. PATENT DOCUMENTS

| 4,983,014 | A | * | 1/1991 | Nattermann | 385/115 |
|---|---|---|---|---|---|
| 6,289,161 | B1 | | 9/2001 | Schotz et al. | 385/142 |
| 6,324,326 | B1 | * | 11/2001 | Dejneka et al. | 385/123 |
| 6,836,607 | B2 | * | 12/2004 | Dejneka et al. | 385/126 |
| 7,139,458 | B2 | | 11/2006 | Koh et al. | 385/127 |
| 7,158,705 | B2 | | 1/2007 | Berkey et al. | 385/123 |
| 7,203,408 | B2 | | 4/2007 | Matthijsse et al. | 385/128 |
| 7,236,672 | B2 | | 6/2007 | Walton et al. | 385/122 |
| 7,590,324 | B1 | * | 9/2009 | Chen et al. | 385/128 |
| 2005/0271347 | A1 | | 12/2005 | Kimball et al. | 385/142 |

FOREIGN PATENT DOCUMENTS

| EP | 1845398 | 10/2007 |
|---|---|---|
| WO | 2008042143 | 4/2008 |

OTHER PUBLICATIONS

"Propagation losses of pump light in rectangular double-clad fibers"; Liu et al; 1996 Society of Photo-Optical Instrumentation Engineers' Opt. Eng. 35(11) 3130-3134 (Nov. 1996).
"Optical data buses for automotive applications"; Kibler, et al; Journal of Lightwave Technology; vol. 22, No. 9, Sep. 2004.

\* cited by examiner

*Primary Examiner*—Charlie Peng
(74) *Attorney, Agent, or Firm*—Svetlana Z. Short

(57) ABSTRACT

According to one example of the invention an optical fiber comprises: (i) a silica based core, said core having a core diameter greater than 80 μm and a numerical aperture $NA \geq 0.24$; and (ii) a silica based cladding in contact with and surrounding the core and having a second index of refraction $n_2$, such that $n_1 > n_2$; wherein the cladding includes B and F. Preferably the numerical aperture NA is at least 0.3.

13 Claims, 5 Drawing Sheets

OPTICAL FIBER AND A METHOD OF MAKING

This application claims the benefit of, and priority to U.S. Provisional Patent Application No. 61/125,955 filed on Apr. 30, 2008 entitled, "Optical Fiber and a Method of Making", the content of which is relied upon and incorporated herein by reference in its entirety.

BACKGROUND OF THE INVENTION

1. Field of the Invention

The present invention relates generally to large NA optical fibers, to optical fibers suitable for use in use in data transmission system, lighting and automotive applications.

2. Technical Background

Optical data networks are increasingly attractive for use in the automotive industry because these networks offer wide bandwidth to the data links for information system, entertainment, engine management and safety functions, at a relatively low price. There are specific requirements for an optical fiber used for automotive applications. First, it is preferred that the fiber is flexible enough to allow easy handling. Second, the fiber preferably should have a high numerical aperture (NA) for easy and efficient coupling of a light source into the fiber. Third, it is preferred that the core of the fiber be large enough to minimize optical coupling loss. Currently, two types of fibers are utilized for automotive applications. The first fiber type is a Polymer Optical Fiber (POF) and the second fiber type is a Polymer Cladding Silica (PCS) fiber.

Optical networks based on POFs are good in terms of mechanical stability and costs for short point-to-point links within the passenger compartment. The main drawbacks for POFs are high attenuation (up to 0.4 dB/m between 630 nm and 685 nm) and a relatively narrow operating temperature range (about −45° C. to about +85° C.). For applications such as sensor systems for safety, engine management systems, drive-by-wire systems, and video processing systems, POF systems are limited by high attenuation and poor temperature stability.

PCS fibers provide lower attenuation and a wider operating temperature range than the POF fibers. However, PCF fibers utilize polymer (plastic) cladding in contact with and surrounding the glass core, for example fluorinated polymer. Fluorinated polymer may not have the desired thermal stability for many applications, and may delaminate from the glass core. It may also be susceptible to moisture damage. When high power sources (greater than 100 Watts) are utilized, or when the PCF fiber is operating at relatively high operating temperatures, the polymer cladding is not robust enough against heat. Under such conditions the polymer cladding carbonizes or burns, which may result in device failure, especially when the fiber is bent. In addition, the polymer cladding ages relatively quickly, losing its mechanical and optical characteristics, and becomes brittle, thus shortening device lifetime.

SUMMARY OF THE INVENTION

The scope of the present invention is determined by the appended claims.

According to one example of the invention an optical fiber comprises (i) a silica based core, said core having a core diameter greater than 80 μm and a numerical aperture NA≧0.24; and (ii) a silica based cladding in contact with and surrounding the core and having a second index of refraction $n_2$, such that $n_1 > n_2$; wherein said cladding includes B and F.

Preferably, the core diameter is greater than 100 μm, more preferably greater than 150 μm, and even more preferably greater than 200 μm. Preferably, the core numerical aperture (NA) is at least 0.3, more preferably at least 0.35. Preferably the silica based cladding includes in weight percent: F, 0.5 wt % to 5 wt %; and B, 0.5 wt % to 20 wt %. More preferably, the silica based cladding includes in weight percent: fluorine—at least 2 wt % and boron—at least 4 wt %.

According to one aspect of the present invention a method of making an optical fiber comprises the steps of: (i) providing a core preform; (ii) depositing boron containing soot onto the core preform to form a soot preform; and (iii) consolidating the soot preform in a furnace at consolidation temperatures of about 900° C. to 1350° C. in the presence of a F containing compound.

According to one embodiment method of making an optical fiber comprising the steps of:

(i) providing a core preform;
(ii) depositing boron containing soot onto the core preform to form a soot preform;
(iii) thermally stabilizing the soot preform in a holding oven between about 150° C. and 450° C.;
(iv) drying said soot preform at temperatures not higher than 950° C.; and
(v) consolidating said soot preform in a furnace while F doping, by sintering in the presence of a F containing compound, at temperatures between 1150° C. and 1350° C.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

DETAILED DESCRIPTION OF THE PREFERRED EMBODIMENTS

Figure 1:
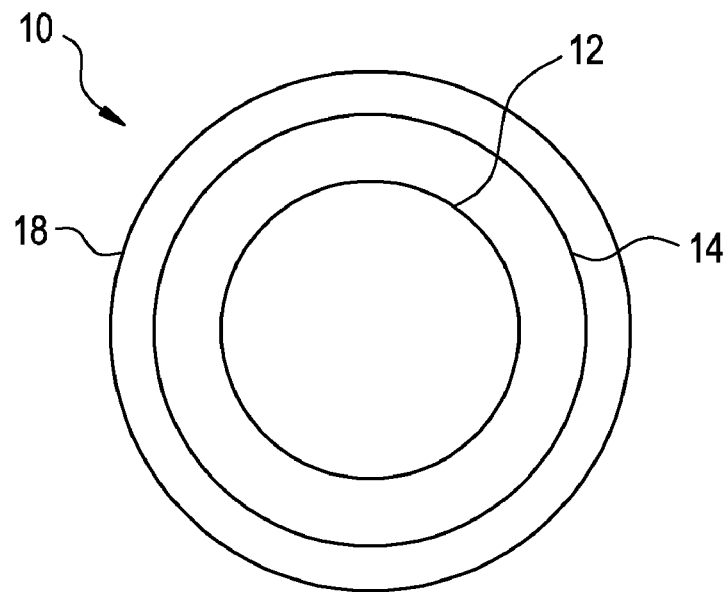
FIG. 1 is a schematic cross-sectional view of one embodiment of the present invention.

Reference will now be made in detail to the present preferred embodiments of the invention, examples of which are illustrated in the accompanying drawings. Whenever possible, the same reference numerals will be used throughout the drawings to refer to the same or like parts. One embodiment of silica core/silica clad optical fiber in accordance with the present invention is shown schematically in FIG. 1, and is designated generally throughout by the reference numeral 10. The optical fiber 10 illustrated in FIG. 1 includes: a silica based, passive (no rare earth dopants) core 12 having a first index of refraction $n_1$; and a silica based down-doped cladding 14 in contact with and surrounding the core 12. The cladding 14 has a second index of refraction $n_2$, such that $n_1 > n_2$. The core 12 and the cladding 14 are made of glass. That is, neither the core 12 nor the cladding 14 is made of polymer(s). A protective coating 18 may surround the cladding 14. The outer coating 18 may be, for example, an organic coating which typically includes a softer primary coating and a harder secondary coating applied over the primary coating.

In this embodiment the silica based core 12 is doped with Ge, but other index raising dopants, for example $Al_2O_3$, $P_2O_5$, $TiO_2$, $ZrO_2$, $Nb_2O_5$ and $Ta_2O_5$ may also be utilized. The core 12 may also be pure silica ($SiO_2$). In the following embodiments the core 12 is passive (i.e., does not amplify light) and does not include rare earth dopants such as Er or Yb. If the core has as circular cross-section, its diameter d is at least 55 μm (e.g., 80 μm to 400 μm), preferably at least 80 μm, more preferably 100 μm, even more preferably at least 150 μm or at least 200 μm. For example, the core diameter may be 200-1000 μm. The core numerical aperture NA is at least 0.24, preferably at least 0.25, more preferably at least preferably 0.3, and even more preferably at least 0.35 (e.g., 0.4, 0.45, 0.47, or 0.5). The $Al_2O_3$ doped glass has low loss in the UV wavelengths, thus the fibers made with $Al_2O_3$ doped silica glass cores are particularly useful for applications in that wavelength range. The $GeO_2$ or $Al_2O_3$ doped fiber cores may be made by conventional OVD process. The refractive index profile of the core 12 can either be a simple step or gradient index.

The glass cladding 14 includes index lowering dopants, such that $n_1 > n_2$, and core NA of >0.24. If the core 12 is a pure silica core, the glass cladding 14 may require higher concentration of index lowering dopant(s). Preferably the silica based cladding 14 includes in weight percent: F, 0.5 wt % to 5 wt %; and $B_2O_3$, 0.5 wt % to 20 wt %. More preferably, the silica based cladding includes in weight percent: F, 1.5 wt % to 3 wt % and $B_2O_3$, 4 wt % to 10 wt % (e.g., 5 wt %, 6 wt %, 7 wt %, or 8 wt % of $B_2O_3$).

It is preferable that cladding outer diameter D is at least 80 μm, more preferably at least 125 μm, and even more preferably at least 225 μm and most preferable at least 250 μm. The cladding diameter may be, for example 225 μm-1200 μm. The cladding width $W_{CLAD}$ is preferably at least 10 μm, more preferably at least 15 μm. For example, $W_{CLAD}$ may be 15 μm to 30 m. Preferably the cladding width is: 0.03 D $\leq W_{CLAD} \leq$ 0.2 D and more preferably 0.03 D $\leq W_{CLAD} \leq$ 0.1 D.

If the cladding 14 does not have a circular cross section, the diameter D is defined as the smallest distance from one side of cladding's cross-section to the oppositely situated side of the cross-section.

According to this embodiment (see FIG. 1), the silica based fiber core 12 includes, in weight percent:
$SiO_2$ 60 to 100 wt %;
$Al_2O_3$ 0 to 15 wt %;
$GeO_2$ 0 to 40 wt %;
$P_2O_5$ 0 to 30 wt %

As discussed above, the fiber core 12 is passive- it includes no active ions to enable either a gain or a lasing action. (Exemplary rare earth dopants are Yb, Er, Nd, Tm, Sm and Tb). Phosphorus may be added to the core materials in order to lower the softening temperature of the core glass, which may be advantageous if the core is produced by the inside vapor deposition process. Phosphorus may also be utilized as a refractive index raising agent.

It is preferable that the index lowering dopant of the cladding 14 comprises Fluorine and/or Boron in weight percent:
F 0.1 to 5 wt %;
$B_2O_3$ 0.1 to 20 wt %.

As discussed above, the amount of updopants in the core 12 and the amount of downdopant(s) for the cladding 14 is chosen to preferably result in a core NA of over 0.24 (e.g., 0.25 to 0.5.) It is preferable that the minimum amount of $B_2O_3$ and F in the cladding 14 be at least 0.5 wt %. It is preferable that the amount of $B_2O_3$ is at least 3 wt %. It is preferable to have more than 1 wt % and more preferably more than 2 wt % of F along with more than 4 wt % of B in the cladding 14. It is even more preferable that the amount of F and $B_2O_3$ be 2 to 3 wt % of F, and 5 to 10 wt % of $B_2O_3$. Preferably no other cladding surrounds the cladding 14.

Figure 2:
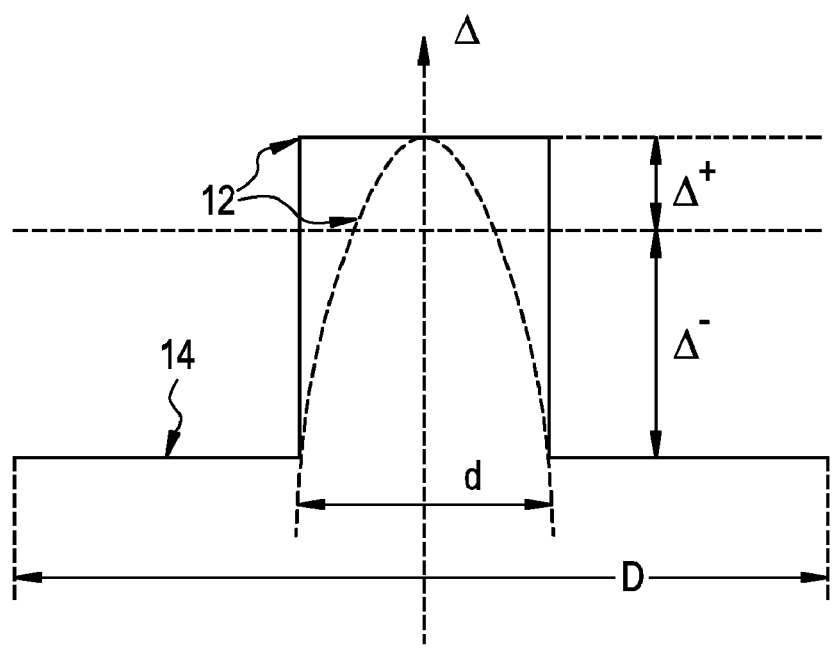
FIG. 2 is a schematic of refractive index profile of the embodiment shown in FIG. 1.

FIG. 2 shows schematically the refractive index profile (Δ vs. radius) of the fiber embodiment of FIG. 1. The symbols $\Delta^+$ and $\Delta^-$ are the relative refractive index delta (with respect to pure silica) in the core and in the cladding, respectively. In this embodiment the refractive index profile is symmetrical around the fiber center. The refractive index of the fiber core 12 may be step index (as indicated by solid lines), or may have another shape, for example a gradient profile in a parabolic (indicated by a dashed line), or another smoothly decreasing shape. The core diameter is d and the fiber cladding diameter is D. The numerical aperture NA of the optical fiber depends on the refractive index difference between the core and cladding, which depends on the up dopant level in the core 12 and Fluorine and Boron dopant levels in the cladding 14, and the refractive index delta Δ of the core relative to cladding is $$\Delta = \left| \frac{n_1^2 - n_2^2}{2n_1^2} \right|.$$

The fiber of FIG. 1 can be produced by the outside-vapor-deposition (OVD) process. The OVD process is a way of making optical fiber through reactions from the desired vapor ingredients (including silica and the other desired dopant precursors) via a hydrolysis process in a $CH_4+O_2$ flame to form the soot-particles, which are then collected by thermopheretic means onto either a bait rod (for making a core soot-preform) or a glass core cane or rod (for making overclad soot-preform). The soot-preform is subsequently dried and densified into solid transparent glass in a high temperature furnace (after the bait rod is removed from the core preform), a process commonly referred to as consolidation. The desired core and cladding compositions are achieved by utilizing different amounts of various vapor-ingredients for each of the layers in the soot preform fabrication process. In summary, the core/ cladding perform is generated first, then consolidated, and the final (consolidated) preform drawn into the optical fiber 10 by known fiber-drawing methods.

More specifically, vapor-precursor-materials that may be used to make the portion of the soot preform associated with the fiber core are, for example, $SiCl_4$, $GeCl_4$, $AlCl_3$, $TiCl_4$, or $POCl_3$. After the soot is consolidated into the core preform (preferably the core preform is made of pure silica or $GeO_2$ doped silica), soot of $SiO_2$ down doped with $B_2O_3$ is deposited on the consolidated core preform to form a soot preform of the cladding portion. A gas containing F, for example $SiF_4$, is used in the consolidation process to lower the refractive index of the cladding portion of the preform. As discussed above, the consolidated glass containing B and F has lower refractive index than pure silica.

More specifically, boron/fluorine codoping in silica glass is accomplished via two steps: (i) boron doping in soot laydown; followed by (ii) fluorine sinter-doping during consolidation.

For example, laydown of boron-doped $SiO_2$ cladding has been done on a pure silica or $GeO_2$ doped silica core rod (i.e., the consolidated and collapsed core portion of the preform) using $BCl_3$ and $SiCl_4$ or B— and Si-containing organometallic precursors, as source materials. It is noted that the capture efficiency of boron in laydown increases as OVD burner flame temperature decreases. The preferred temperature range during the laydown step is about 1400° C. to 1600° C. for the target boron oxide content of the soot of 10 wt % to 12 wt %, and suitable soot density (for example less than 0.6 $gm/cm^3$, more preferably less than 0.5 $gm/cm^3$, and even more preferably less than 0.4 $gm/cm^3$) for easier F sinter-doping at the subsequent consolidation step. Such a boron-doped soot made preform usually has high OH content and high stress level, due respectively to the lower temperature hydrolysis process and higher thermal expansion coefficient of the soot composition. To prevent the likelihood of the soot-preform from cracking, a thermal stabilization step is preferred for the soot-preform prior to its F-sinter doping at consolidation. The soot preform is preferably thermally stabilized at 100° C. to 500° C., for example in a 300° C. holding oven under a dry inert gas atmosphere for about 8 hours. In this regard, thermal stabilization may be for 3 to 24 (e.g., 10, 12, 16, or 18 hours), with longer thermal stabilization for larger size soot preforms.

The soot preform according to this exemplary embodiment is then consolidated in furnace with a F compound, for example with $SiF_4$, or $CF_4$. Fluorine (F) sinter-doping into the boron-containing soot-preform, according to an embodiment of this invention, is a single-zone consolidation process. The entire consolidation process occurs in the lower temperature furnace's drying zone region, which is usually situated in the upper part of the standard consolidation furnace. Consolidation is done at relatively low temperatures due to the rather low glass-transition temperature ($T_g$) of the B/F co-doped silica (which around 800° C., or lower). The exemplary silica soot preform (doped with 10 wt % B) is first $Cl_2$-dried at around 850° C.-900° C. for 45-60 minutes. The dry-zone temperature is then ramped-up to 1200° C. for sinter/F doping for 90 to 150 minutes with $SiF_4$. During sintering and F doping, the boron composition in consolidated glass drops significantly, such as from 10 wt % in the soot phase to 4-8 wt % in the fully consolidated glass phase. Such a reduction is caused by etch out of boron in the presence of fluorine. As a result, the boron and fluorine concentration in glass may be in the range of 4-8 wt % and 1.5-2.5 wt %, respectively. After the consolidation process, the consolidated preform is cooled down and taken to fiber draw.

Thus, according to some embodiments a method of making an optical fiber comprises the steps of:
(i) providing a core preform (e.g., a glass core rod);
(ii) depositing boron containing soot onto the core preform to form a soot preform;
(iii) thermally stabilizing the soot preform, for example in a holding oven, at a temperature between about 100° C. and 500° C. (preferably 150° C. to 450° C., more preferably 275° C. to 350° C.);
(iv) drying the soot preform at temperatures preferably is no more than 950° C. to achieve low OH levels (of less than 100 ppb); and
(v) consolidating the dried soot preform in a furnace by: sintering the dried soot preform between about 1150° C. and 1350° C. in the presence of a F containing compound to provide F doping.

It is noted, that in this embodiment, no F is deposited during B deposition while forming the soot preform, and no additional B is supplied to the dried soot preform during consolidation step. It is also noted that during the boron deposition step B may be supplied as $BCl_3$, $BF_3$, or in another form.

Figure 3A:
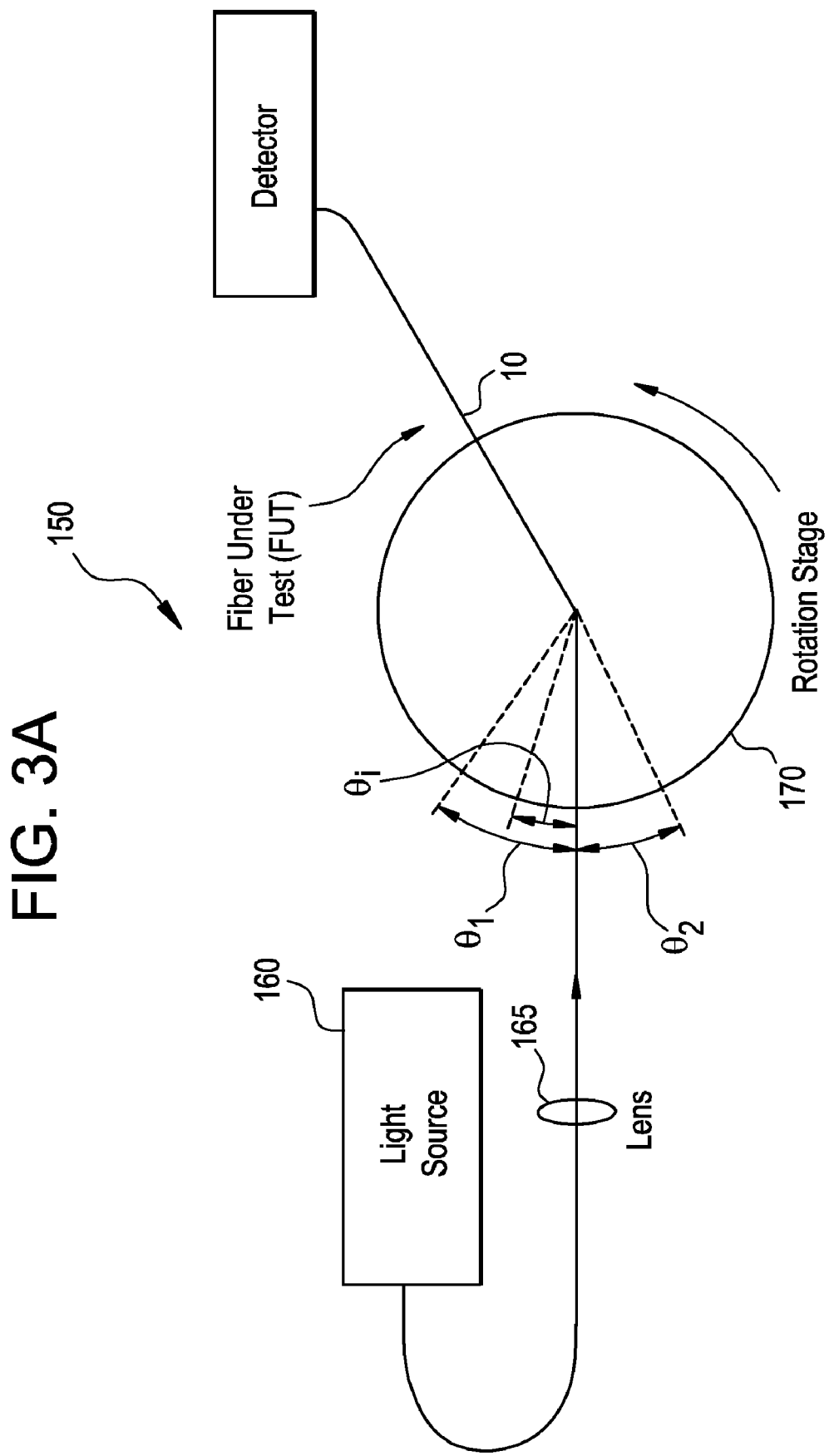
FIG. 3A illustrates a measuring device for measuring numerical aperture of the fiber under test.

The numerical aperture of the resulting fibers may be measured, by an angular measurement method similar to that described, for example, in the article entitled "Propagation losses of pump light in rectangular double clad fibers" by Anping Lu and Kenichi Ueda, 3134 Optical Engineering, Vol. 35 No. 11, November 1996. We used a device for NA measurement that is similar to the one described in this article. This NA (numerical aperture) measurement device 150 is shown schematically in FIG. 3A. A light source 160 so it can provide a measurement (source) wavelength at about 850 nm, or 1060 nm, or 1310 nm, or 1550 nm to a collimating lens 165. The light from the source, after exiting the collimating lens 165, becomes a collimated beam. The collimated light beam is incident on the cleaved end of the fiber under test (i.e., fiber 10). The fiber under test is mounted on a rotation stage 170, in which the rotation angle can be precisely controlled. We step through a range of the input angles (θi) to the fiber 10, and obtain the beam profile (i.e., power of the exiting light as a function of the input angles (θi)), by measuring exiting beam power from the fiber 10 with a detector 180. The NA of the fiber 10, at a given wavelength, can then be calculated by the sine of the half of the full angle, where the full angle is calculated to be $|\theta_1-\theta_2|$. A threshold power level is set to determine the $\theta_1$ and $\theta_2$. For example, when the threshold level is set at the 5% of the peak power, we can find the angles $\theta_1$ and $\theta_2$, at which the beam power reaches 5% of its peak power level, and the NA at 5% threshold is calculated by $$NA = \sin\left(\frac{\theta_1 - \theta_2}{2}\right).$$

Similarly, the NA can also be calculated at a different threshold for example 2.5%. The NA can also be measured at several different wavelengths. In general, the wavelength dependence of the NA is not major. We have used the method and the device to measure a fiber with well known characteristic.

EXAMPLES

The present invention will be further clarified by the following examples.

Example 1

Figure 3B:
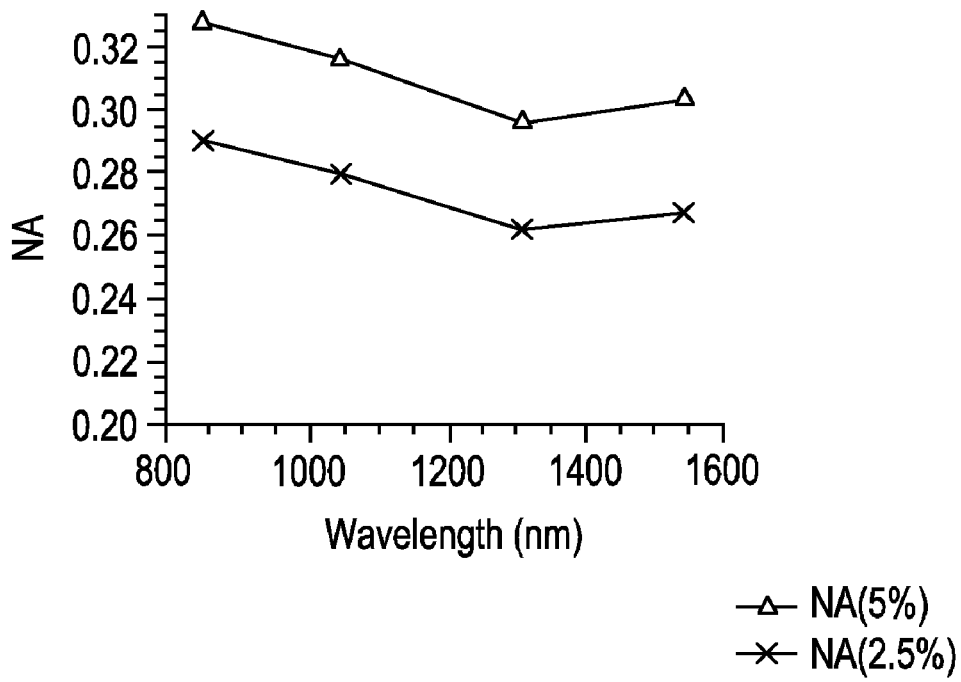
FIG. 3B is a measured numerical aperture (NA) as a function of wavelength for an exemplary fiber according to one embodiment of the present invention, using thresholds of 5% and 2.5%.

This fiber has a pure silica (step index) core 12 and fluorine and boron co-doped cladding 14. The cladding 14 is doped with 2 wt % Fluorine and 5 wt % $B_2O_3$. The diameter of the fiber core 12 is 200 microns and the outer diameter of the cladding 14 is 230 microns. The fiber has a numerical aperture NA of about 0.29 at 5% threshold and about 0.33 at 2.5% threshold measured at a wavelength of 850 nm. FIG. 3B illustrates measured NA as a function of wavelength. It can be seen that there is some variation of the core NA over different wavelengths. This is largely due to the wavelength dependence of the tails in the angular beam profile, however, the magnitude of the variation does not exceed 10-15% of the NA. Using Eq. (1), the total refractive index delta between the core 12 and the cladding 14 of this exemplary fiber is calculated to be 2.0%.

Example 2

We have also made three fibers with pure silica core and Boron/Fluorine codoped cladding with several core and cladding dimensions. The composition of boron and fluorine in these three fibers is the same as that described for the fiber in Example 1 (i.e., 2 wt % Fluorine and 5 wt % Boron). Fibers 2 and 3 are "scaled up" versions of fiber 1. That is, the ratio of core diameter to cladding diameter are the same. The diameters of the fiber core and cladding are listed in the Table 1 below.

TABLE 1

| Fiber | Core Diameter (um) | Cladding Diameter (um) |
|---|---|---|
| fiber 1 | 62.5 | 125 |
| fiber 2 | 122 | 247 |
| fiber 3 | 211 | 423 |

Figure 4:
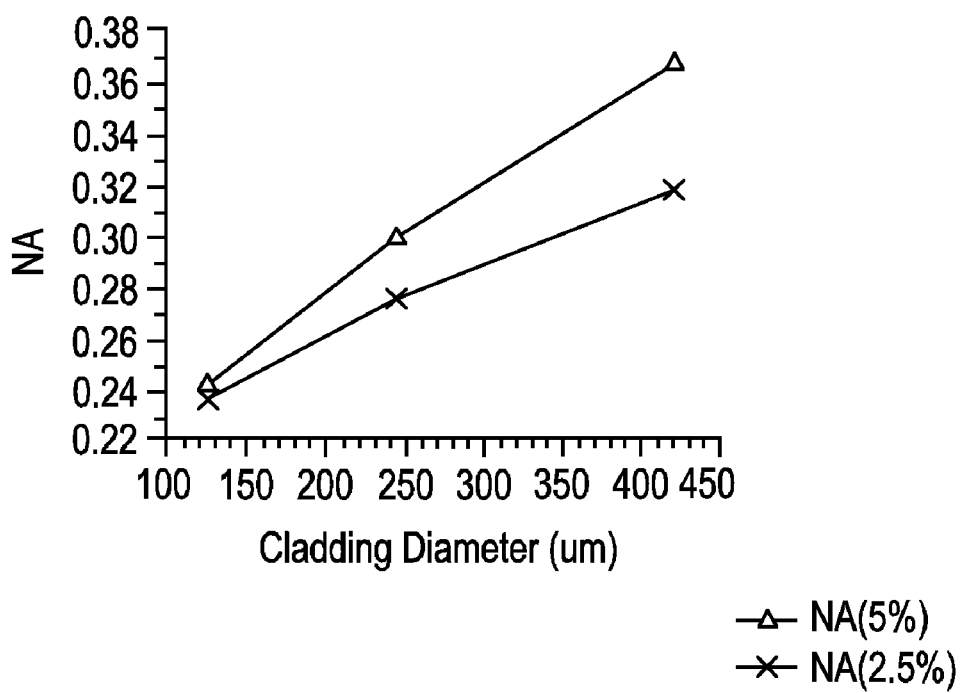
FIG. 4 illustrates the NA measured at 850 nm of three exemplary fibers depicted in Table 1, using thresholds of 5% and 2.5%.

The three fibers were made from the same preform, but with different scaling factors. The numerical aperture of these three fibers, measured at around 850 nm is shown in FIG. 4. More specifically, FIG. 4 illustrates that as fiber cladding diameter increases, measured NA increases essentially (almost) linearly and that higher NA is achieved with larger outer fiber diameter. (The behavior is different from conventional fibers where is NA is determined by the optical refractive indices of the fiber core and fiber cladding and is essentially independent of the fiber dimension.) The additive combination of optical refractive index contributed by the individual amounts of the boron and fluorine does not yield the NA we observed when these materials are employed in combination. For example, with a pure silica core and a silica cladding doped 2 wt % fluorine and 5 wt % $B_2O_3$ one would expect a decrease in optical index by −0.65% delta because 2 wt % fluorine contributes −0.56% delta, and 5% wt $B_2O_3$ contributes −0.09% delta. (The −0.65% delta corresponds to 0.165 NA). However, the measured NAs for these fibers are in the range of 0.25-0.35. (See FIG. 4.)

In addition, the observed NA values were found to be dependent upon the fiber drawing temperatures. Higher draw temperature leads to higher NA. The highest NA we can achieve is at 2100° C. (at the draw furnace, in proximity to the root region of the optical fiber preform). Similarly, observed NA values were also found to be dependent upon the fiber diameter. The larger fiber diameter gives higher NA for a given draw temperature. The numerical aperture (NA) of the fiber scales with the net tensile or compressive stress-level in the B/F doped silica cladding. (Increasing the tensile stress in the B/F codoped cladding increases NA, while increasing the compressive stress decreases NA.) Finally, the NA was also found to be impacted by the thickness of the B/F silica cladding, due to leakage of the higher order modes HOMs (i.e., light leaking from the core to the cladding and then out decreases NA). However, a cladding thickness of greater than 5 microns and preferably greater than 10 or 15 microns (e.g., ≧25 microns) is generally sufficient to minimize and/or overcome leakage of the higher order modes.

Example 3

Figure 5:
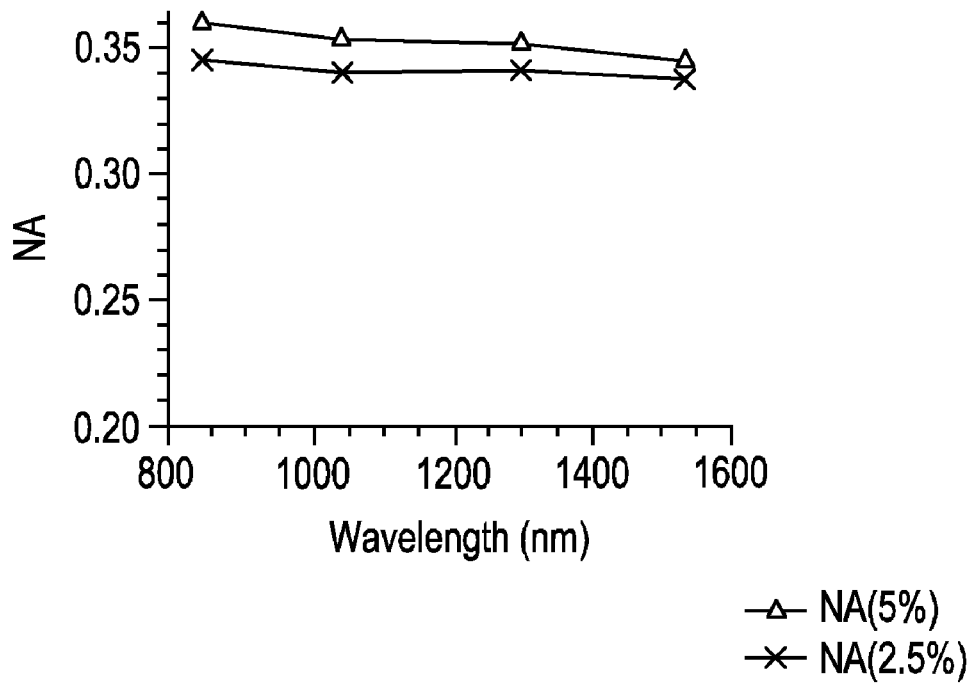
FIG. 5 is a measured NA as a function of wavelength for an exemplary fiber, using thresholds of 5% and 2.5%.

We made a fiber with Ge-doped gradient index core 12 which has about 2% refractive index delta relative to the pure silica, and B/F codoped cladding 14 (5 wt % $B_2O_3$ and 2 wt % F). This 2% core delta contributes about 0.275 NA, relative to pure silica. The diameter of the fiber core in this exemplary fiber is 200 microns and the cladding diameter is 230 microns. The fiber's NA at different wavelengths is shown in FIG. 5. Due to B/F codoped cladding, this fiber has a high NA value of 0.345 (at a wavelength of 850 nm, using 5% NA threshold).

Example 4

Figure 6:
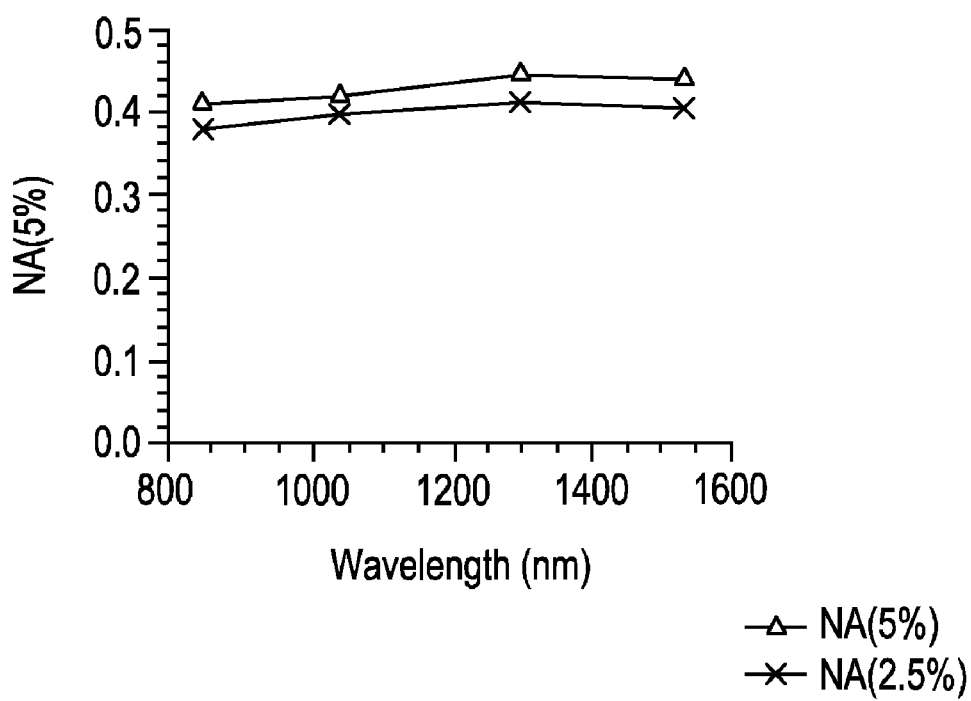
FIG. 6 is measured NA of yet another exemplary optical fiber embodiment, using thresholds of 5% and 2.5%.

We also have made another high NA fiber with Ge-doped gradient index core profile and composition similar to that of fiber of example 3, and B/F codoped cladding 14 (5 wt % $B_2O_3$ and 2 wt % F). This fiber has a core diameter of 348 microns and a cladding diameter of 400 microns. The NA measurement results of this fiber are shown in FIG. 6. At a larger diameter and the same type of core profile and composition as that of the fiber of Example 3, this fiber of Example 4 demonstrates higher NA value. At a wavelength of about 850 nm, the NA value of this exemplary fiber is 0.38, and the NA value increases moderately with increased wavelength. The NA of this exemplary fiber is greater than 0.4 at a wavelength of 1300 nm.

Example 5

Several high NA fibers were manufactured with a Ge-doped gradient index core 12 similar to that of the fibers of Examples 3 and 4, and a B/F codoped cladding 14 (5 wt % $B_2O_3$ and 2 wt % F). The fiber dimension parameters and the NA values are listed in Table 2. All three fibers of Table 2 (fibers A, B and C) are made from the same preform. As shown in Table 2, all three fibers have NA (as determined by the 5% threshold) greater than 0.41, measured at the wavelength of 850 nm.

TABLE 2

| Fiber | Core Diameter (µm) | Cladding Diameter (µm) | NA @ 850 nm |
|---|---|---|---|
| Fiber A | 212.5 | 250 | 0.416 |
| Fiber B | 212.5 | 250 | 0.419 |
| Fiber C | 340 | 400 | 0.417 |

One of the advantages of the fibers according to the present invention is that the high NA enables efficient coupling of fibers 10 to the light source such as LED or VCSEL. For practical automobile applications, the NA needs to be greater than 0.3, more preferably greater than 0.4, and most preferably greater than 0.5. It's also desirable to have a large core in order to achieve easy coupling. However, if the fiber core is too large, the fiber 10 becomes less flexible and thus less convenient to deploy. For practical automotive applications, the fiber core diameter d is preferably in the range between 50 and 300 µm, preferably between 60 and 300 µm, more preferably between 100 and 300 µm, even more preferably between 150 and 250 µm, and most preferably between 180 to 200 µm. The cladding thickness $W_{CLAD}$ is preferably between 5 µm and 200 µm, more preferably between 10 µm and 100 µm, for example between 12 µm and 80 µm (e.g., 15, 20, 30, 40, 50, 60, 70, 75 or 80 µm).

Figure 7:
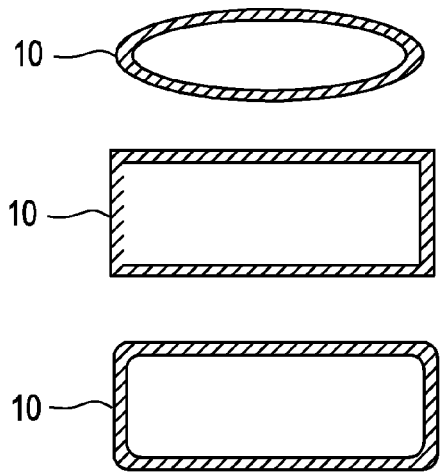
FIG. 7 illustrates cross-sections of several noncircular fibers according to some embodiments of the present invention.

In the above exemplary embodiments, the fiber cross section is circular. In other embodiments, optical fibers 10 have noncircular cross sections. FIG. 7 illustrates three examples cross-sections of noncircular fibers 10 with high numerical apertures (NA). The high NA fiber with noncircular cross-section is particularly useful for high power fiber delivery system, for example when a high energy laser beam from a high power LD (laser diode) with a rectangular optical emitter is coupled into the fiber 10. The use of noncircular fibers can eliminate beam shaping optical components which are used to reshape the beam to circular in order to match the fiber diameter and NA. This allows direct coupling between LD and the high NA noncircular fiber, which matches LD sizes and NA. Utilization of high NA non-circular fibers embodiments not only reduces device complexity, but also improves overall device efficiency.

Figure 8:
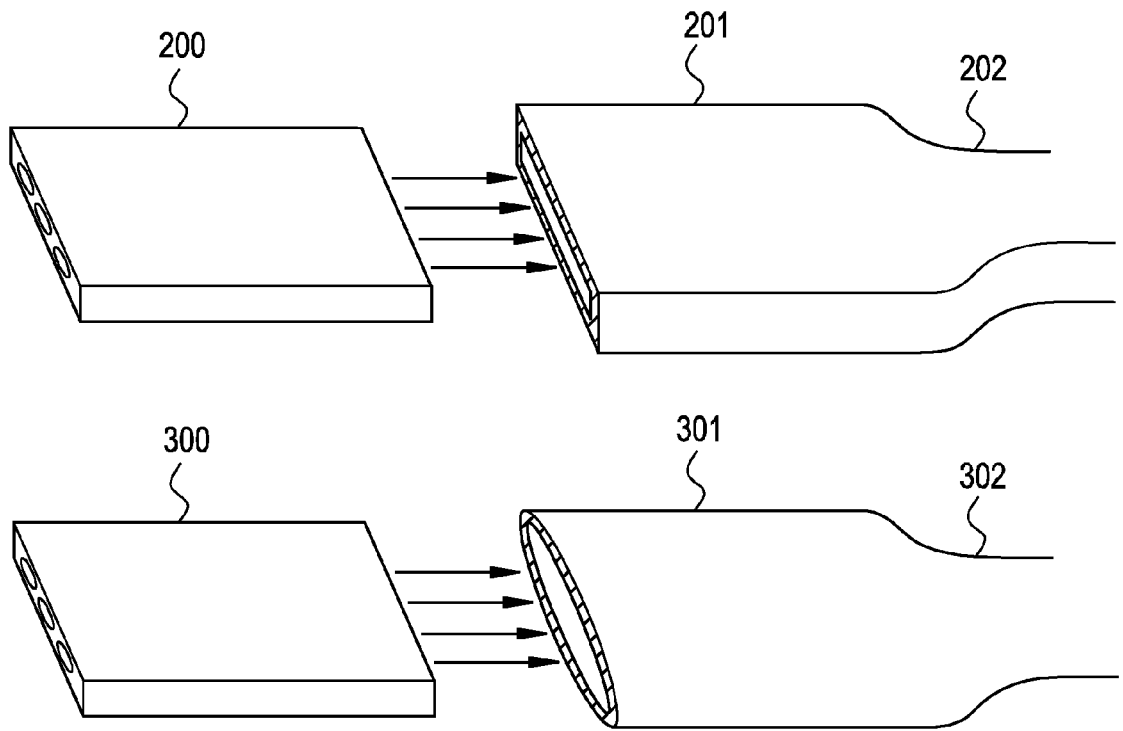
FIG. 8 is a schematic showing coupling between a high power laser diode and the noncircular fiber according to some embodiments of the present invention.

Furthermore, the optical fiber 10 with either circular or noncircular cross-sections can be tapered down, to a smaller sized fiber with either circular or other cross-sectional shapes. For example, a fiber with NA=0.44 and a core size of 200× 600 µm can achieve greater than 95% efficiency for a typical LD with a NA of 0.22 using a long tapering fiber section (see sections 202 and 302) as shown in FIG. 8 with a taper ratio of 2 (e.g., section 201 to section 202, or fiber section 301 to fiber section 302) to reduce the fiber's cross-sectional dimensions (e.g., length and width, respectively) from 200 µm by 600 µm to 100 µm by 300 µm. The fiber cross-section can be, for example, an ellipse, rectangle, polygon, or corner-rounded shape such as a rounded rectangle. The cross-section aspect ratio is preferably at least 1:3 but not greater than 1:10, in order to match LD emitter size. FIG. 8 schematically illustrates coupling between a high power LD 200 and the fibers 10 with the non-circular cross-sections, with larger fiber sections 202 and 302 facing the LED 200.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An optical fiber comprising:
    (i) a silica based core, said core having a core diameter greater than 80 µm, and index of refraction $n_1$, and a numerical aperture NA≧0.24, at a 5% threshold;
    (ii) a silica based cladding in contact with and surrounding the core and having a second index of refraction $n_2$, such that $n_1 > n_2$, wherein said cladding comprises B and F.

2. The optical fiber according to claim 1 wherein said core diameter is at least 150 µm.

3. The optical fiber according to claim 1 wherein said core numerical aperture NA is at least 0.3.

4. The optical fiber according to claim 1 wherein said core numerical aperture NA is at least 0.35.

5. The optical fiber according to claim 1, wherein said core is multi moded.

6. The optical fiber according to claim 1, wherein the concentration of B and F in the cladding is in weight percent: F, 0.5 wt % to 5 wt %; and $B_2O_3$, 0.5 wt % to 20 wt %.

7. The optical fiber according to claim 1, wherein the amount of Boron and Fluorine is as follows:
    F 1 to 5 wt %; and
    $B_2O_3$ 3 to 20 wt %.

8. The optical fiber according to claim 1, the silica based cladding includes in weight percent: $B_2O_3$—at least 4 wt %, and Fluorine—at least 2 wt %.

9. The optical fiber according to claim 1, wherein the core has Ge and/or Al.

10. The optical fiber according to claim 1, wherein the core is pure silica.

11. The optical fiber according to claim 1, wherein said fiber core includes no active rare earth dopant(s).

12. The optical fiber according to claim 1, wherein said fiber has a non-circular cross-section.

13. The optical fiber according to claim 1, wherein said fiber is tapered.

* * * * *